(12) United States Patent
Tallos et al.

(10) Patent No.: US 9,879,796 B2
(45) Date of Patent: Jan. 30, 2018

(54) AUTOMATED THERMAL RECIRCULATION VALVE

(71) Applicant: Therm-Omega-Tech, Inc., Warminster, PA (US)

(72) Inventors: Nicholas Tallos, Narberth, PA (US); Glenn Quinty, Chalfont, PA (US)

(73) Assignee: THERM-OMEGA-TECH, Inc., Warminster, PA (US)

( * ) Notice: Subject to any disclaimer, the term of this patent is extended or adjusted under 35 U.S.C. 154(b) by 368 days.

(21) Appl. No.: 13/769,597

(22) Filed: Feb. 18, 2013

(65) Prior Publication Data

US 2014/0230907 A1   Aug. 21, 2014

(51) Int. Cl.
| | |
|---|---|
| F16K 35/06 | (2006.01) |
| G05D 23/02 | (2006.01) |
| G05D 23/19 | (2006.01) |
| F16K 31/00 | (2006.01) |

(52) U.S. Cl.
CPC .......... F16K 31/002 (2013.01); G05D 23/02 (2013.01); *Y10T 137/0324* (2015.04); *Y10T 137/7737* (2015.04)

(58) Field of Classification Search
CPC .............................. F16K 31/002; G05D 23/00
USPC ....................................................... 239/99 K
See application file for complete search history.

(56) References Cited

U.S. PATENT DOCUMENTS

| | | | |
|---|---|---|---|
| 2,259,846 A | 10/1941 | Vernet et al. | |
| 2,396,138 A * | 3/1946 | Vernet | .............................. 60/527 |
| 2,636,776 A | 4/1953 | Vernet | |
| 2,638,127 A | 5/1953 | Griswold | |
| 2,830,767 A * | 4/1958 | Herbenar | ..................... 236/99 R |
| 3,515,368 A * | 6/1970 | Kelly | ...................... F02P 5/103 |
| | | | 123/349 |
| 3,921,665 A * | 11/1975 | Lebzelter | ................. F16K 11/07 |
| | | | 137/553 |
| 4,016,901 A | 4/1977 | Kenny | |
| 4,175,310 A * | 11/1979 | Boyd | .............................. 29/229 |
| 4,180,208 A * | 12/1979 | Obermaier | ........... G05D 23/022 |
| | | | 236/100 |
| 4,878,512 A | 11/1989 | Pirkel | |
| 5,058,804 A | 10/1991 | Yonekubo et al. | |
| 5,816,493 A | 10/1998 | Pirkle | |
| 5,971,288 A * | 10/1999 | Davis et al. | ................. 236/68 R |
| 7,681,804 B2 | 3/2010 | Lockhart | |
| 2006/0157575 A1* | 7/2006 | Lockhart | ..................... 236/93 A |

(Continued)

FOREIGN PATENT DOCUMENTS

| | | | | |
|---|---|---|---|---|
| CN | 101761972 A | * | 6/2010 | |
| GB | 2127529 A | * | 4/1984 | ......... F24D 19/1033 |

OTHER PUBLICATIONS

Jorgen, How Water Heating Installation, Apr. 11, 1984, GB2127529A, Whole Document.*

(Continued)

*Primary Examiner* — Larry Furdge
(74) *Attorney, Agent, or Firm* — Cusick IP, PLLC; Clinton J. Cusick, Esq.

(57) ABSTRACT

An automated thermally actuated valve utilizing a thermally expansive substance to substantially close the valve at a first temperature and a spring to open the valve at a second, lower temperature. A method of utilizing an automated thermally actuated valve to balance and manage hot water supply in a piping system.

20 Claims, 5 Drawing Sheets

(56) References Cited

U.S. PATENT DOCUMENTS

2007/0290058 A1* 12/2007 Guterman .................. 236/93 R
2008/0257969 A1* 10/2008 Nember ..................... 236/93 A

OTHER PUBLICATIONS

Xuecheng et al., Non-negative Pressure Hot Water Supply System for Domestic Use, Jun. 30, 2010, CN101761972A, Whole Document.*

* cited by examiner

AUTOMATED THERMAL RECIRCULATION VALVE

BACKGROUND OF THE INVENTION

Field of the Invention

The present general inventive concept is directed to a device that provides automated regulation of hot water systems, and a method of utilizing the device to improve performance in hot water systems.

Description of the Related Art

The prior art includes spring loaded valves utilizing thermal expansion of a solid, liquid, or phase change to effect opening or closure of a valve. U.S. Pat. No. 5,816,493 to Pirkle discloses an improved thermally expansible composition that contains silicone rubber and does not require a diaphragm or seal. This concept is insufficient for use in closed systems where the automated valve is installed in-line and in contact with a fluid such as water for extended periods, and will not provide consistent operation over time. Within hot water systems such as showers and sinks, it is known to utilize a valve to direct water flow. It is a common problem that the distance between the hot water heater or hot water source and the location where the user wishes to utilize the hot water causes a delay related to the pipe volume between the source and the user divided by the flow rate. In larger structures or larger diameter pipes, the delay can be substantial. Constant recirculation of hot water within the piping system is commonly utilized to reduce the delay in the delivery of hot water. However, in addition to the delay caused by distance and pipe volume, complex systems can experience resistance to the flow of hot water including gravity. A single hot water source within a system containing many faucets or outlets may not deliver hot water to all parts of the system equally, or sufficiently, to meet demand. Typical installations include the use of a pump, mixing valves, and other manual adjustments to attain delivery to all parts of a piping system in the face of gravity, flow restrictions, and other complicating factors either fixed or dynamic.

Numerous attempts to optimize the delivery of hot water in complex systems have been made. Providing a hot water source nearer to the user is one potential solution, but can be very costly with the additional equipment needed. Providing constant recirculation can reduce the delay as well, but is difficult to regulate in large systems. For example, recirculated water will travel the path of least resistance such that in multistory buildings, the top floors will not receive sufficient recirculation flow. What is needed is an automated valve that can be installed in-line with existing piping systems, that requires no maintenance or adjustment, and can automatically adjust the recirculation flow to ensure the availability of hot water in complex piping systems.

Other attempts to address this problem have been insufficient. For instance U.S. Pat. No. 7,681,804 B2 to Lockhart discloses a temperature-controlled valve that can be inserted above a shower head. This device can be activated by a user to start the flow of water into the shower. The valve will then substantially close after the hot water arrives at the valve. This valve does not obviate the delay in the arrival of the hot water supply. It merely reduces the waste of hot water that would be caused by an inattentive user that is not present at the moment hot water supply arrives. It does allow for a large amount of water to go down the drain while waiting for hot water supply. Numerous other valves have been manufactured and some have been patented, but most require adjustment or settings that make them unsuitable for installation in a piping system behind walls or access panels. What is needed is a valve that provides automated recirculation to ensure that hot water is available soon after requested by a user

SUMMARY OF THE INVENTION

It is an aspect of the present invention to provide a flow control valve that automatically adjusts the flow of a fluid to manage the fluid flow within a piping system based on temperature.

It is a further aspect of the present invention to provide an automated hot water recirculation valve that automatically adjusts the flow of recirculated hot water within a piping system to ensure that hot water is present throughout the hot water piping system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the embodiments, taken in conjunction with the accompanying drawings of which.

DETAILED DESCRIPTION

Figure 1:
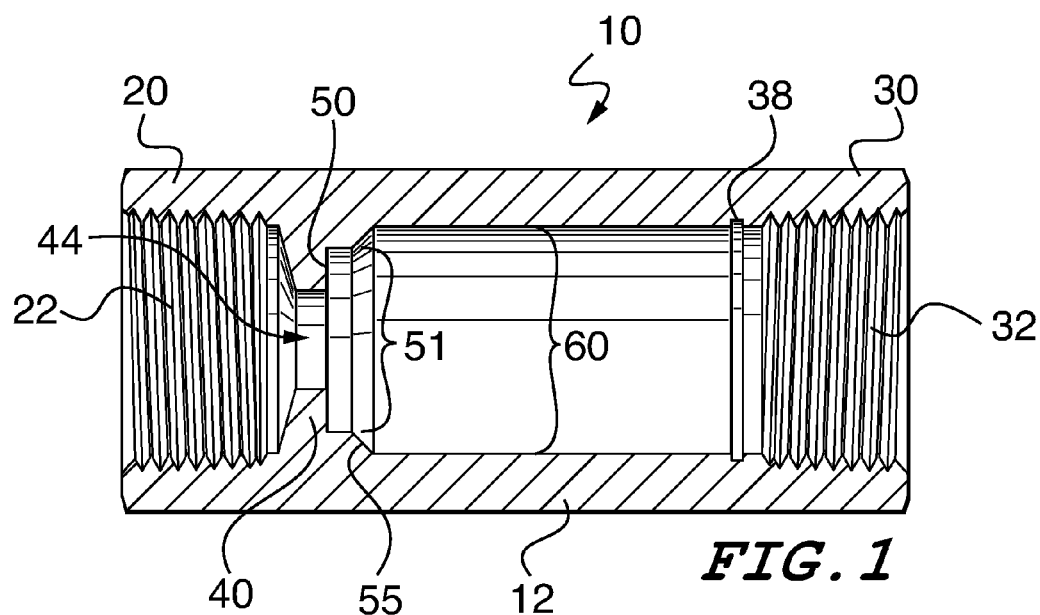
FIG. 1 is a cross section of a casing, according to an embodiment.

Reference will now be made in detail to the presently preferred embodiments of the invention, examples of which are illustrated in the accompanying drawings, wherein like reference numerals refer to like elements throughout.

The present inventive concept relates to an automated valve that provides automated flow regulation based on fluid temperatures. A valve that is preset can be installed without specific expertise in thermal valves, thereby reducing installation cost. The valve should operate automatically to increase or decrease flow to ensure proper management of fluid flow. Additionally, the valve should be made with a minimum number of components to reduce cost. Further, the valve should allow at least some flow at all temperatures so that sanitation operations such as high temperature flush or chemical flush of piping systems is not thwarted. The valve should also provide consistent performance over time and not degrade when contacted with hot water, chlorinated water, or other fluids. The above aspects can be obtained by a pipe segment containing a spring biased piston driven by a cup filled with a thermally expansive substance that drives the piston towards a closed position when it is heated to a desired temperature. The piston is surrounded by a piston casing that substantially obstructs a seat opening in the valve to reduce flow. When the thermally expansive substance is cooled, the spring provides a return force and pushes the piston casing and piston away from the seat opening to open the valve. While the automated valve of the invention can be utilized with any number of fluids, such as ethylene glycol, hydraulic oils, poly alpha olefin, or fuel oils, discussion of the valve as used within hot water systems will be utilized for clarity of explanation and as water is the most commonly used fluid.

The automated valve will open to allow flow of hot water in a piping system when the assembly is cooled, ensuring the additional flow of water in that part of the piping system. When the flow of water is sufficiently warm, the piston and piston casing are driven towards the closed position, substantially reducing the flow of water within that portion of the piping system. Thus, the valve ensures that flow is substantial when the temperature is below a set point in order to enable the movement of hot water in the recirculation system. When the hot water is present, the valve automatically reduces flow to a small amount so that unnecessary recirculation of hot water in that portion of the piping system is avoided. The recirculation pump of the system will need to pump less water as the warm parts of the system will automatically allow reduced recirculation flow. The valve does not completely close to ensure thermal communication with the system and to provide other safety features including access of all parts of the piping system to hot water flush or chemical flush to ensure sanitary conditions. The present inventive concept can be specifically adapted to provide automated regulation of hot water systems, and a method of utilizing the device to improve performance in hot water systems. The automated valve can automatically open and allow water (or other liquid) flow when the liquid is below a certain temperature, and the automated valve can automatically close and block water (or other liquid) when the liquid is above a certain temperature. In one embodiment, a series of these automated valves can be utilized in a piping system to optimally and automatically distribute water order to provide showers, faucets, and other receiving elements with immediate hot water when possible. The valve can be placed at the end of a piping run in a building for instance having a piping run on each floor. In a basic system, all of the piping runs return to a single recirculation pump. The valve can be installed into the piping at the end of each run before it joins the common return pipe. In this way, flow can be restricted by the valve in piping runs that are satisfactorily hot, thereby ensuring that flow is distributed to the runs in which the valve is open. A valve experiencing cool fluid flow or flow below a desired set point would be in an open position, allowing additional flow through that section of the system or that piping run. In this way, a set of valves can automatically balance fluid flow in a system subject to dynamic changes in demand and usage.

An embodiment of the invention comprises a casing 10 that is suited for installation within a line of conventional piping. FIG. 1 shows a cross section of the casing 10. The casing 10 is preferably constructed of metal, more preferably 303 stainless steel as it is machineable and it does not contain lead. The casing body 12 is cylindrical and substantially hollow. Casing first end 20 is preferably configured in a substantially hexagonal circumference (see FIG. 2) to accept conventional wrenches and tools. Casing first end 20 is threaded in the interior of the casing with conventional pipe threading to form first end pipe threads 22. Casing second end 30 is positioned opposite first end 20 and is preferably configured in a substantially hexagonal circumference (see FIG. 2) to interface with conventional tools used to rotate casing 10. Casing second end 30 is threaded in the interior of the casing with conventional pipe threading to form second end pipe threads 32. Disposed within casing body 12 and located proximal to first end pipe threads 22 is seat 40 containing seat opening 44. Seat 40 effects a reduction of cross sectional void within casing 10.

Dimensions are given for a one inch internal diameter valve for clarity only. The valve can be configured in a number of sizes for installation within a variety of plumbing systems. As one inch internal diameter (ID) piping is commonly used, representative dimensions will be given for elements within the figures corresponding to a device that is configured for one inch ID piping. This configuration will be referred to as a "one inch ID configuration" when providing dimensions. The diameter of seat opening 44 can be 0.1 to 0.5 inches and in a one inch ID configuration can be for example 0.393 to 0.394 inches. Casing interior diameter 60 can be 0.5 inches to 1.2 inches and can be for example about 0.9 inches. In a one inch ID configuration, casing interior diameter 60 can be fabricated to 0.906 plus or minus 0.002 inches. Seat interface 50 is the surface of seat 40 facing towards casing second end 30. Seat interface 50 is preferably smooth and has a seat interface diameter shown as 51. In a one inch ID configuration seat interface diameter 51 can be machined within a range of 0.735 to 0.745 inches. Seat ramp 55 in the interior of the casing body 12 increases the interior diameter of the casing from seat interface diameter 51 to casing interior diameter 60. The inner surface of the casing body 12 is smooth and designed to accept a thermal assembly (not shown in FIG. 1). Retaining groove 38 is disposed within the casing body 12 adjacent to casing second end 30. In a one inch ID configuration, retaining groove 38 can be approximately 0.054 inches deep, is approximately $\frac{1}{20}^{th}$ of an inch wide (within a tolerance of 0.046 to 0.051 inches wide), and forms a complete loop. Casing first end 20 can be threaded to a depth of 0.69 inches, and casing second end 30 can be threaded to a depth of 0.655 inches.

Figure 2:
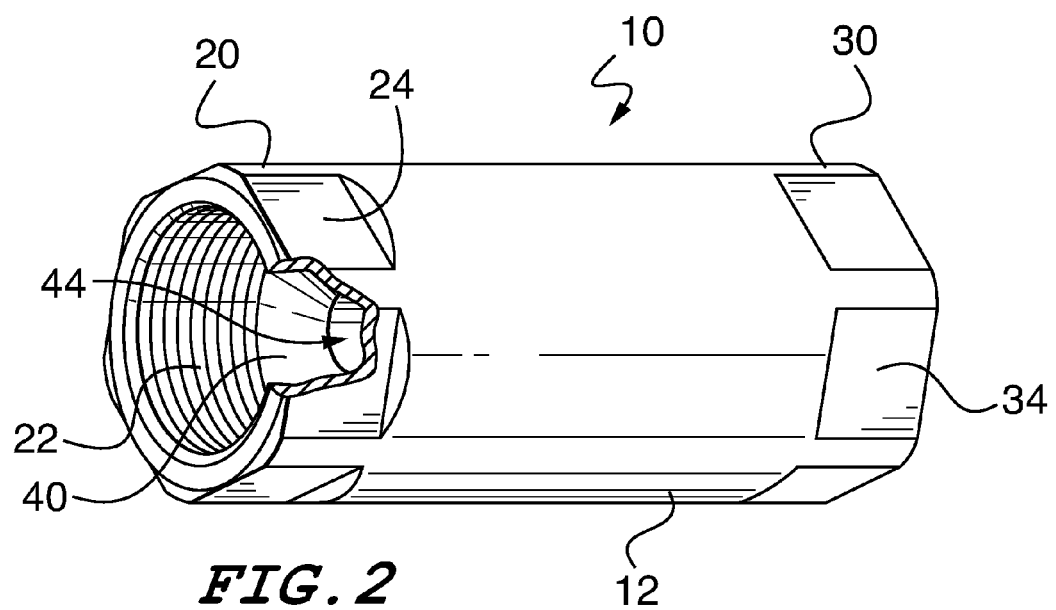
FIG. 2 is a perspective view of a casing, according to an embodiment.

FIG. 2 presents a perspective view of the casing 10. Casing body 12 is cylindrical, casing first end 20 is shown with substantially hexagonal circumference 24 and first end pipe threads 22. Similarly, second end 30 is shown with substantially hexagonal circumference 34. Interior to the casing 10 and viewable through the cutaway in casing first end 20 is seat 40 and seat opening 44.

Figure 3A:
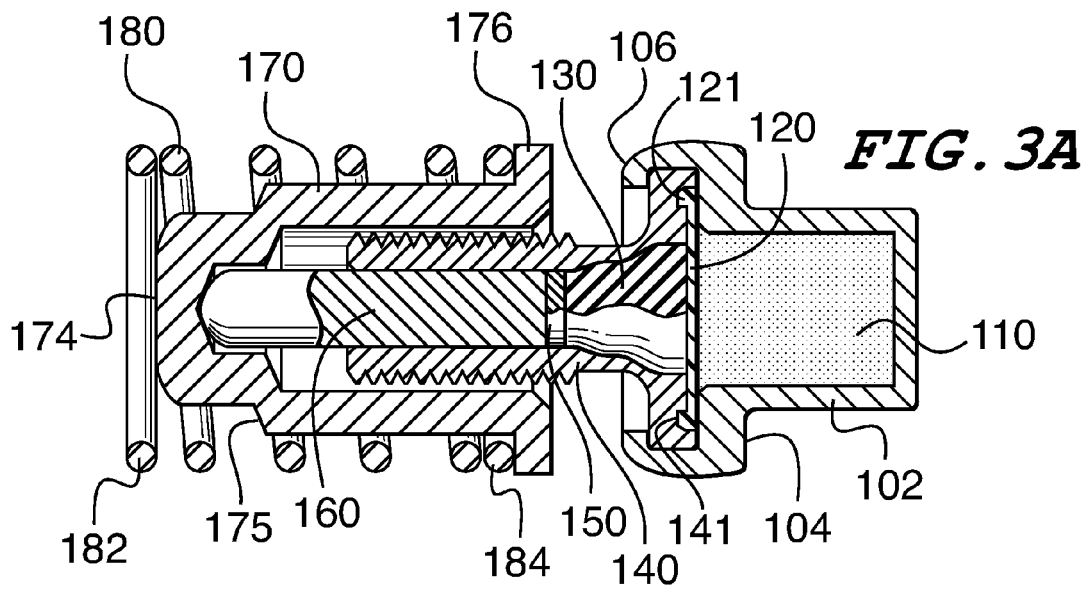
FIG. 3A is a cross section of the thermal assembly in a compressed configuration, according to an embodiment.

FIG. 3A presents a cross section of the thermal assembly of the invention in a compressed configuration. FIG. 3A represents the open position in which water can flow through the valve because the thermal assembly is in a compressed or open configuration. In order to create a thermally responsive automated valve, a material that exhibits a phase change can be utilized. A preferable material will change from a solid to a liquid at a temperature near, but less than, the desired recirculated fluid temperature of the system. The phase change effects an expansion and change in volume. Paraffin, an aliphatic hydrocarbon, is a suitable material. In particular, twenty two carbon length docosane has a suitable melting point of approximately 44.4 degrees C. or 112 degrees F. Longer chain carbon molecules exhibit higher melting points, and shorter chain carbon molecules exhibit lower melting points as is known in the art, and these alternatives can be adapted to achieve a phase change at other temperatures. For example, n-Heptadecane exhibits a melting point of 22.0 degrees C., whereas n-Octacosane exhibits a melting point of 61.4 degrees C. For regulation of hot water systems, cup 102 can be filled with thermally expansive substance 110, for example paraffin, namely n-Docosane. The melting point of thermally expansive substance 110 corresponds to a set point for the valve. Fluid flowing through the valve with a temperature above the set point will cause the thermally expansive substance 110 to melt and cause the automated valve substantially close. Fluid temperatures below the set point will cause thermally expansive substance 110 to solidify and cause the automated vale to open. The selection of a thermally expansive substance 110 will provide a set point for the thermal assembly approximate to the melting point of the thermally expansive substance 110. Cup 102 is configured with cup collar 104 to interface with other parts of the invention. Molded diaphragm 120 is preferably made of an elastomer material such as fluorocarbon elastomer that can deform and allow expansive substance 110 to push the diaphragm towards plug 130. In one embodiment, the molded diaphragm 120 is prepared using a compression mold die set in the form of the desired shape, roughly disc-shaped. The die is filled with polymer, preferably Viton Brand GF600S fluorocarbon elastomer and compression molded under heat and pressure. The material can be cooled within the die to produce a molded part. The molded part can be trimmed of excess material to a desired shape. The molded part then can be post cured at 450 degrees Fahrenheit for up to five hours to increase molecular cross linking to add strength and flexibility and create a molded diaphragm. Molded diaphragm 120 can be held in place by threaded guide 140 which is in turn retained by the crimping of cup lip 106. Thus, elements 102, 120, and 140 can be fixedly connected and positions of elements 102 and 140 can be fixed relative to each other. Molded diaphragm 120 can comprise a sealing bead 121 about the exterior circumference. Sealing bead 121 interfaces with annular groove 141 within the threaded guide 140, and each are formed of corresponding shape, thickness, and depth to ensure a seal between the diaphragm 120 and threaded guide 140. Elements 102, 140, and 121 are fixed relative to each other while the center of molded diaphragm 120 is able to move or deflect as needed.

Plug 130 is preferably composed of an elastic material including silicone or rubber or other suitable elastomer. In an embodiment, plug 130 can be made of fluorocarbon elastomer, e.g. Viton brand, 600LF. [Available from DuPont Elastomers. Plug 130 can be roughly cone shaped to fit within threaded guide 140. The cone shape accentuates the lateral movement of the molded diaphragm as the larger diameter of the plug is forced into threaded guide 140. The additional material of the progressively larger conical diameter elongates when entering the restrictive opening to provide increased lateral movement of the piston 160. In one embodiment, diaphragm 120 displacement of 0.1 inches is translated to 0.15 inches of piston travel through the function of the conical shaped plug 130. Anti-extrusion disk 150 is made of a non stick material, and in an embodiment, Teflon brand PTFE, and is positioned between plug 130 and piston 160 to prevent deformation of plug 130 at the interface of plug 130 and anti-extrusion disk 150. Piston 160 is positioned within threaded guide 140 and adjacent to anti-extrusion disk 150. Piston casing 170 is generally cylindrical in shape and positioned about piston 160 and threaded guide 140. Piston casing 170 can be biased towards cup 102 by spring 180. Piston casing collar 176 projects outward from piston casing 170 and engages spring second end 184. The elements in FIG. 3A comprise the thermal assembly. The elements of FIG. 3A are shown in a compressed configuration that corresponds to an "open" position and a cool, or solid, thermally expansive substance 110.

Figure 3B:
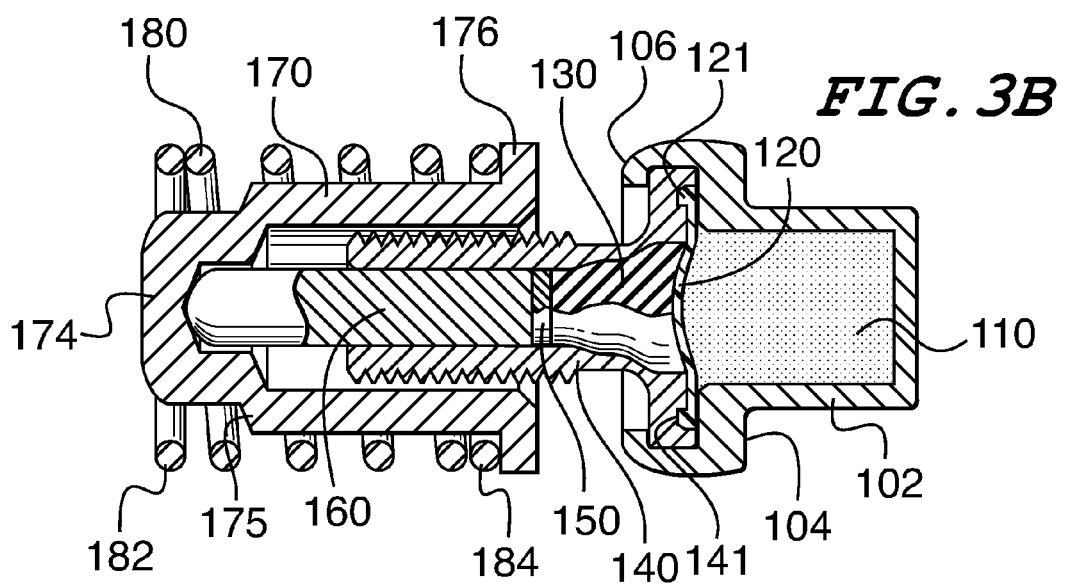
FIG. 3B is a cross section of the thermal assembly in an expanded configuration, according to an embodiment.

FIG. 3B illustrates the thermal assembly in the warm, or substantially closed position, because the water flowing through is at or above the melting point which automatically causes the thermal assembly to expand. When thermally expansive substance 110 warms past the melting point, it changes phases and expands, deforming the central portion of the molded diaphragm 120 and in turn forcing elements 130, 150, 160, and 170 away from the cup 102. When extended, piston casing end 174 substantially obstructs seat opening 44 (not shown), to reduce fluid flow. Dimensions are given for a configuration designed to interface with conventional one inch diameter piping. An embodiment of the invention can be scaled up or down to meet other needs and other piping sizes. As the one inch diameter piping is common, dimensions are provided to enable the practice of an embodiment of the invention, but the function and scope of an embodiment of the invention are not limited to these specific dimensions or configuration. The diameter of 174 is preferably less than seat opening 44 to allow minimum flow in substantially closed position. In a one inch ID configuration, where seat opening 44 is approximately 0.393 inches wide, piston casing end 174 can be machined to a diameter of 0.392 to 0.3925 inches to provide a minimum clearance of 0.0005 inches. This opening is sufficient to allow fluid flow in pressurized systems. Piston casing ramp 175 aids in the insertion of piston casing 170 into spring 180. The distance from piston casing ramp 175 to piston casing end 174 can be about 0.188 inches. Piston 160 can have a diameter of 0.155 inches. Piston casing collar 176 can have an exterior diameter of about 0.720 inches, and piston casing 170 can have a length of 0.843 inches. Cup length can be about 0.555 inches. When thermally expansive material 110 cools and changes to a solid with decreased volume, piston casing 170 and adjacent elements are forced towards cup 100 by spring 180, returning thermal assembly to the positions shown in FIG. 3A. Spring first end 182 contacts seat interface 50 (not shown). Spring 180 including ends 182 and 184, can be approximately equal in diameter to seat interface diameter 51 (not shown). Spring 180 provides a return force to push the elements of the valve into an open position when the valve is cooled.

Figure 4A:
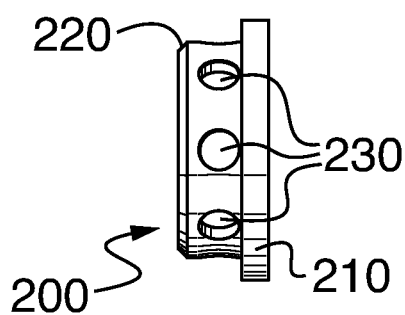
FIG. 4A is a side view of the carrier, according to an embodiment.

Additional elements of an embodiment of the present invention are utilized to position thermal assembly 100 within the casing 10. FIG. 4A presents a side view of a carrier 200. Carrier 200 is generally cylindrical and sized to fit within casing 10, not shown. Carrier holes 230 are present around the circumference of the carrier and allow a fluid to flow through the carrier assisting thermal communication throughout the interior of the valve. In one embodiment shown in FIG. 4A, eight carrier holes 230 are present, but other numbers and placements can be utilized. Bevel 220 is present on a first side of carrier 200, and provides a smooth edge. Carrier collar 210 is present on a second side of carrier 200. Carrier collar 210 has a diameter greater than the interior diameter of retaining ring in FIG. 4B. In a one inch ID configuration, carrier has a minimum interior diameter of 0.510 inches. Collar 210 can have an interior diameter of 0.640 inches and an exterior diameter of 0.092 inches. Carrier holes 230 each can have a diameter of 0.140 inches.

Figure 4B:
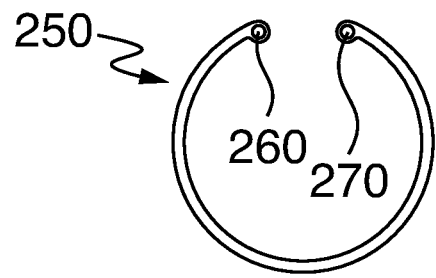
FIG. 4B is a perspective view of a retaining ring, according to an embodiment.

FIG. 4B shows a perspective view of retaining ring 250 comprising first eyelet 260 and second eyelet 270. Retaining ring 250 can be configured to sit within retaining groove 38 as shown in FIG. 1. When positioned, retaining ring 250 prevents the movement of carrier 200 in FIG. 4A past the position of retaining ring 250. In a one inch ID configuration, the interior diameter of retaining ring 250 can be 0.803 inches, the exterior diameter can be 0.971 inches, and carrier outside diameter of FIG. 4A can be 0.900 inches.

Figure 4C:
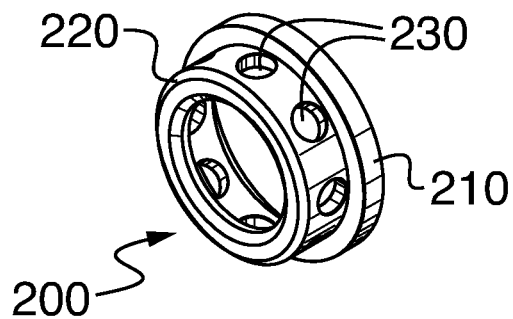
FIG. 4C is a perspective view of the carrier, according to an embodiment.

FIG. 4C shows a perspective view of carrier 200 showing the circular nature of the element.

Figure 5A:
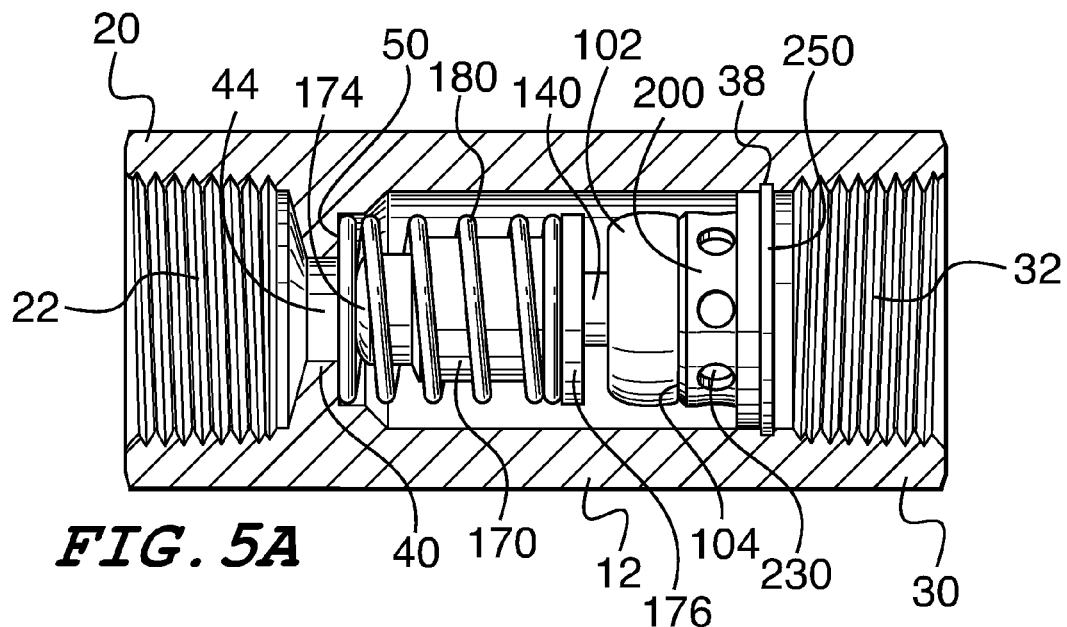
FIG. 5A is a cross section view of a casing and a side view of a thermal assembly, in a compressed configuration, according to an embodiment.

FIG. 5A presents a side view of a thermal assembly positioned within a cross section of the casing body 12. The thermal assembly is shown in a compressed configuration corresponding to an open valve position or a "cold" configuration. Threaded guide 140 is shown within piston casing 170. Piston casing 170 is positioned within spring 180. Piston casing end 174 is shown separated from seat interface 50. Cup 102 contacts carrier 200 which is held in place by retaining ring 250 inserted within retaining groove 38. Unlike second end pipe threads 32 which are oriented in a spiral, retaining groove 38 comprises a single groove suitable for insertion of a ring. Retaining ring 250 can be compressed and inserted into retaining groove 38. This configuration prevents spring 180 from forcing the elements of the valve out of position. The maximum travel of the elements within the casing body 12 towards casing second end 30 is determined by the position of retaining ring 250 which is determined by the position of retaining groove 38. Carrier 200 has a diameter greater than the inside diameter of retaining ring 250 and thus carrier 200 cannot pass retaining ring 250. Cup 102 sits partially within carrier 200. Cup collar 104 has a diameter sufficient to interface with carrier 200 and prevent movement of the thermal assembly past the carrier 200.

Figure 5B:
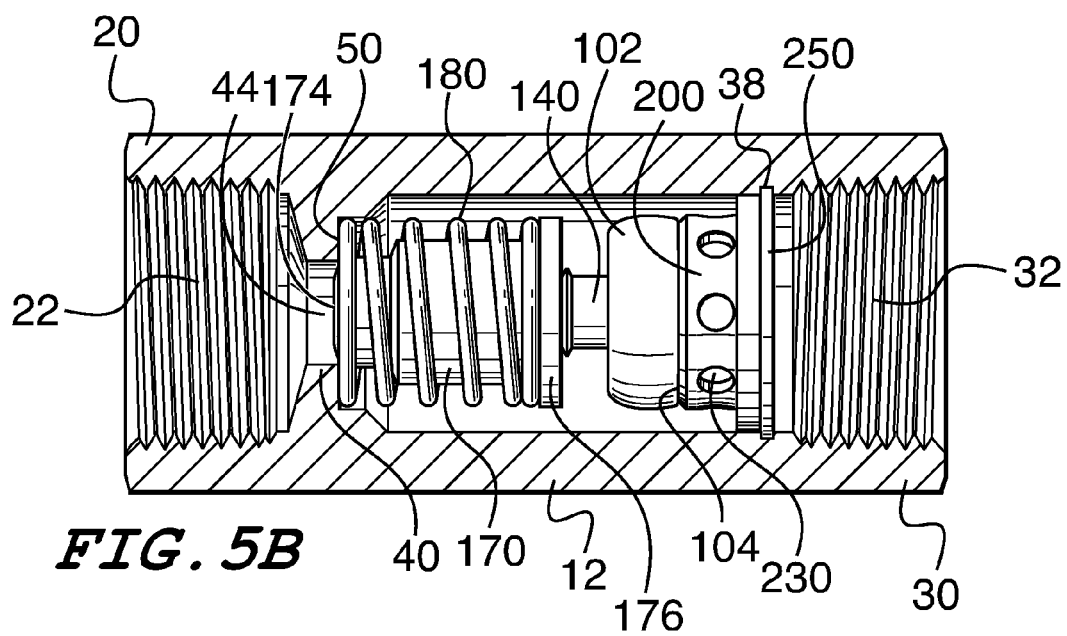
FIG. 5B is a cross section view of a casing and a side view of a thermal assembly in an expanded configuration, according to an embodiment.

FIG. 5B shows a side view of a thermal assembly positioned within a cross section view of casing body 12 corresponding to an "expanded" or "hot" configuration. The piston casing 170 is shown displaced to the left so that piston casing end 174 substantially obstructs seat opening 44. When the thermal assembly is warmed above the desired set point, the valve is substantially closed, allowing only a small amount of fluid to flow through the valve.

Figure 6:
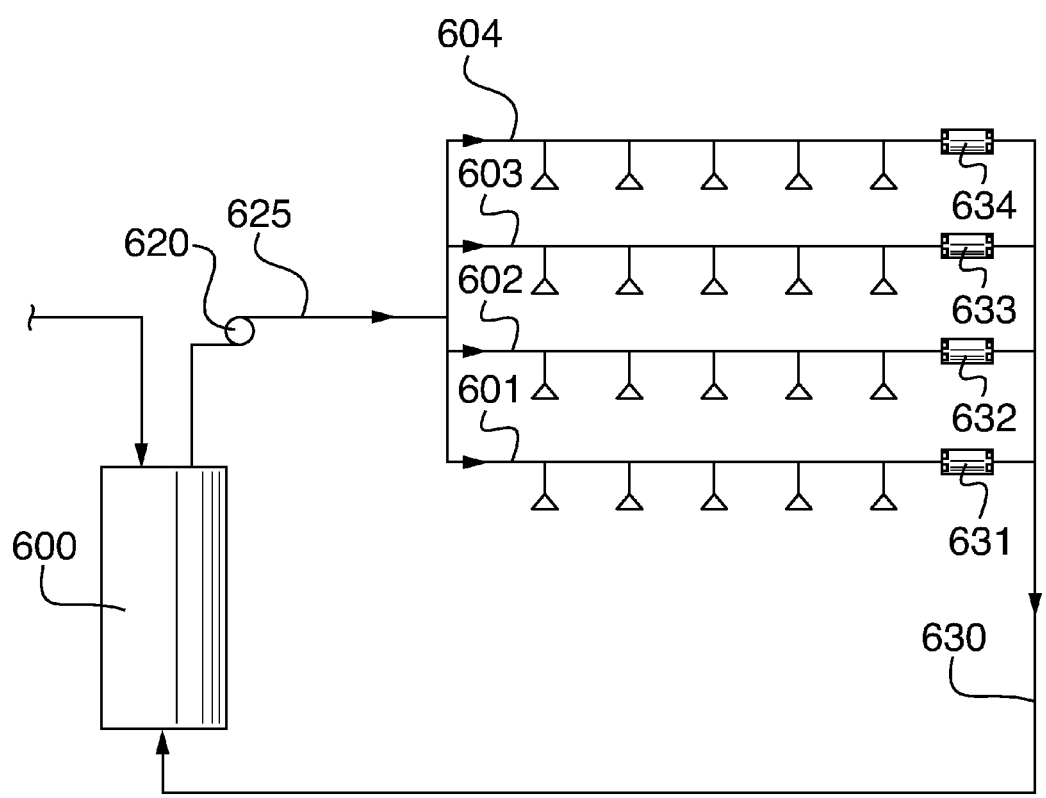
FIG. 6 is a schematic drawing of a piping system, according to an embodiment.

FIG. 6 presents a schematic of a piping system. The configuration of the automated valve within a piping system is shown. The schematic in FIG. 6 represents a hypothetical four story building, however, any piping system size or configuration is contemplated by the invention. Hot water heater 600 is connected to pump 620 through any conventional means including piping. Pipe 625 is connected to four different branches 601, 602, 603, and 604 representing the four stories of a building. Each floor contains multiple shower heads for illustration. The multiple fixtures are connected as the piping system is united in one return pipe 630 that returns unused, recirculated hot water to the hot water heater 600. At the end of branch 601, automated valve 631 is installed in line. At the end of branch 602, automated valve 632 is installed in line. At the end of branch 603, automated valve 633 is installed in line ("automated valve" refers to the valve shown in FIGS. 1-5 and their accompanying description herein). At the end of branch 604, automated valve 634 is installed in line. Each valve is configured so that it will be substantially open to the flow of water when below a set point or "cold." In this way, the pressure created by pump 620 will cause water to flow through the associated branch of the piping system that contains an automated valve in a "cold" or substantially open position. The automated valve will warm up upon the arrival of hot water and will substantially close. This will prevent large amounts of water being recirculated through the branch of the piping system that contains the substantially closed automated valve. Thus, if pipe runs 601, 602, and 603 are sufficiently warm, automated valves 631, 632, and 633 will be substantially closed, limiting the recirculation flow through the respective portions of the piping system. If the top floor represented by pipe run 604 is receiving insufficient hot water flow, automated valve 634 will be at a temperature below the set point and cause the automated valve to open to effect the flow of hot water through pipe run 604, or the fourth floor of the building. At the point where recirculated hot water flow in pipe run 604 is sufficiently warm to cause the automated valve to close, recirculated water in pipe run 604 is substantially reduced. These movements automatically occur within the valve based on temperature of fluid flow. In this way, the valve is automated and operates continuously, dynamically, and without the need for user intervention.

Additionally, in another embodiment, a thermally expansive mixture can also be employed. Instead of a single substance such as paraffin, the thermally expansive substance can comprise a thermally expansive mixture. A thermally expansive mixture can be employed that provides improved responsiveness and reliability. One thermally expansive mixture is composed of an elastomer, a thermally conductive material, and a thermally expansive substance. In an embodiment the thermally expansive mixture comprises a thermally conductive material namely copper powder, a thermally expansive substance namely paraffin, preferably C22 or docosane, and an elastomer such as Elastol, a viscoelastic polymer available at www.elastol.com. Elastomers, including Elastol, add to the cohesion of the mixture and increasing the workability of the mixture. One suitable composition of the thermally expansive mixture is accomplished by mixing by weight 20% paraffin, 4% viscoelastic polymer, and 76% copper powder. The thermally expansive mixture is placed within cup 102. The device of the invention functions as described in the preceding figures. When heated, the wax expands and melts, experiencing a phase change and accompanying increase in volume. The phase change and increase in volume provide and sufficient force to cause movement of the diaphragm, plug, and piston. The phase change occurs at the melting point of the thermally expansive mixture. The melting point of the thermally expansive mixture corresponds to the "set point" of the valve in that the valve will activate or function at the "set point." The conductive material increases thermal conductivity within the mixture and increases the responsiveness of the invention by reducing the time required for the wax to melt. The elastomer increases the viscosity of the mixture and aids in shaping the mixture in constructing the valve, as well as coalescing the mixture upon cooling. The thermally expansive mixture can be created by thoroughly mixing elastomer and thermally conductive material in a container such as a mixing bowl. In one composition, 4% of the total batch weight of Elastol is combined with 76% of the total batch weight of copper powder. Simple mechanical mixing and sifting are sufficient to distribute the materials. Paraffin materials with a melting point below room temperature must be heated to create a thermally expansive mixture. For example n-docosane must be heated to a liquid state. Utilizing a metal mixing bowl on a hot plate or flame burner is sufficient to melt the paraffin. A standard mixer with a hook attachment can be utilized at 60 to 120 rpms for 15 minutes to sufficiently blend the Elastol, n-docosane, and copper powder. Heat should be applied to the mixing container to prevent the paraffin component from solidifying. Faster mixing speeds are not desired as they may result in aeration of the mixture.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An automated valve comprising:
   a casing providing flow between a first end and a second end and having a casing interior wall;
   said casing comprising a central hollow configured to receive a thermal assembly;
   said casing interior wall comprising an area of reduced cross sectional void space forming a seat;
   said seat comprising a seat opening having an inside diameter open to flow through said casing;
   said thermal assembly comprising a thermally expansive substance within a cup and sealed with a molded diaphragm, said thermal assembly configured to expand to move a piston to position a piston casing end comprising a piston casing end outside diameter into said seat opening to obstruct flow through said casing when said thermal assembly is heated above a set point;
   said piston casing end outside diameter is less than said inside diameter of said seat to maintain communication flow through said casing between said seat and said piston casing end when said thermal assembly is fully expanded and said piston casing end is inserted into said seat opening;
   a carrier configured to position said thermal assembly within said central hollow of said casing;
   said seat comprising a seat interface configured to retain a spring between said seat interface and a piston casing collar to automatically move said piston casing end out of said seat opening when said thermal assembly is cooled below a set point; and
   a retaining ring disposed within a retaining groove disposed on said casing interior wall and configured to retain said carrier within said casing.

2. The automated valve of claim 1 wherein said thermal assembly further comprises:
   a conical plug positioned between said molded diaphragm and an anti-extrusion disk further contacting said piston, a threaded guide positioned about said conical plug, anti-extrusion disk, and piston, said threaded guide fixedly clamped to said molded diaphragm by crimping a top edge of said cup to form a cup lip, and a piston casing positioned about said piston and said threaded guide, and said spring positioned about said piston casing.

3. The automated valve of claim 2 wherein:
   said seat opening is proximate said first end, and said retaining groove is disposed proximate said second end;
   said carrier comprises a plurality of radial openings;
   said cup comprises a cup collar; and
   said carrier abuts said cup collar to force flow through said casing to pass through said radial openings.

4. The automated valve of claim 3 wherein:
   said thermal assembly is positioned within said casing between said seat and said retaining groove, said cup is positioned interior to said carrier, and said retaining ring further maintains the position of said thermal assembly within said casing.

5. The automated valve of claim 3 wherein said first end further comprises:
   an exterior circumference having at least three pairs of parallel surfaces and a threaded interior and said second end further comprises an exterior circumference having at least three pairs of parallel surfaces and a threaded interior providing that the automated valve can be inserted into a piping line by threaded attachment.

6. The automated valve of claim 4 wherein said thermally expansive substance comprises a paraffin wax.

7. The automated valve of claim 4 wherein said thermally expansive substance comprises n-Docosane.

8. The automated valve of claim 4 wherein said thermally expansive substance comprises a mixture of paraffin wax, a thermally conductive metal, and an elastomer.

9. The automated valve of claim 4 wherein said thermally expansive substance comprises a mixture of approximately twenty percent by weight n-Docosane, approximately four percent by weight elastomer, and approximately seventy six percent copper flake.

10. The automated valve of claim 4 wherein said threaded guide further comprises an annular groove and said molded diaphragm further comprises an annular bead, and said annular bead is positioned within said annular groove and fixed in relative position by said cup lip.

11. The automated valve of claim 4 wherein said molded diaphragm comprises a fluorocarbon elastomer.

12. The automated valve of claim 3 wherein said conical plug is formed of an elastomeric material, and said threaded guide possesses an interior diameter that is narrower proximate said anti-extrusion disc than proximate said molded diaphragm.

13. The automated valve of claim 4 wherein said carrier further comprises a carrier first side and a carrier collar positioned opposite said carrier first side, said carrier collar possessing an exterior diameter larger than the diameter of said carrier first side.

14. The automated valve of claim 13 wherein said exterior diameter of said carrier collar is greater than an interior diameter of said retaining ring.

15. The automated valve of claim 1 wherein said casing is formed from a single unitary piece of metal.

16. A method of distributing fluids, comprising:
    providing a hot water piping system comprising a hot water supply line supplying hot water to a plurality of hot water piping runs, each of said hot water piping runs comprising at least one plumbing fixture configured to supply hot water to a user, and each of said hot water piping runs discharging into a common return pipe;
    inserting a first automated valve at an end of a first hot water piping run at a location downstream of a first plumbing fixture and upstream of said common return pipe;
    inserting a second automated valve at an end of a second hot water piping run at a location downstream of a second plumbing fixture and upstream of said common return pipe;

determining by said first automated valve a first fluid temperature interior to said first automated valve, and permitting flow through said first automated valve when said first fluid temperature is below a first set point, and automatically reducing cross sectional area available to flow through said first automated valve when said first fluid temperature is above said first set point;

determining by said second automated valve a second fluid temperature interior to said second automated valve, and permitting flow through said second automated valve when said second fluid temperature is below a second set point, and automatically reducing cross sectional area available to flow through said second automated valve when said second fluid temperature is above said second set point;

wherein said first and second automated valves comprises a casing having a first end and a second end, a thermal assembly, a carrier, and a retaining ring disposed within a groove on an interior wall of said casing, wherein said thermal assembly expands to push a piston casing into a seat opening in a seat to obstruct flow between said ends of said casing when said thermal assembly is warmed above said set points;

a piston casing end outside diameter is less than an inside diameter of said seat opening to maintain communication flow through said casing between said seat and said piston casing end when said thermal assembly is fully expanded and said piston casing end is inserted into said seat opening.

17. The method as recited in claim 16, wherein said first set point corresponds to a melting point of a thermally expansive substance interior said first automated valve.

18. The method of claim 16 wherein the step of inserting said first automated valve comprises inserting the automated valve of claim 1.

19. The method of claim 16 wherein the step of inserting said first automated valve comprises inserting the automated valve of claim 8.

20. An automated valve comprising:

a thermally expansive substance that when heated above the melting point of said thermally expansive substance, expands to push a molded diaphragm towards a plug which in turn pushes a piston and a piston casing having an exterior diameter into a seat opening having an interior diameter and adjacent a threaded casing end to substantially obstruct fluid flow through the automated valve, a spring positioned between a seat interface and a piston casing collar to provide a return force so that when said thermally expansive substance is cooled below said melting point, said piston and said piston casing are pushed away from said seat opening to open the automated valve to fluid flow, said thermally expansive substance held within a cup and said cup is maintained within a casing by a carrier and a retaining ring disposed within a wall of said casing;

wherein said exterior diameter is less than said interior diameter providing for insertion of said piston casing into said seat opening.

* * * * *